United States Patent
Choi et al.

(10) Patent No.: US 7,668,316 B2
(45) Date of Patent: Feb. 23, 2010

(54) METHOD FOR ENCRYPTING AND DECRYPTING METADATA

(75) Inventors: Yang-lim Choi, Seongnam-si (KR); Yun-sang Kim, Suwon-si (KR); Yun-ho Choi, Seoul (KR); Hyo-seop Shin, Seoul (KR); Dong-ho Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1135 days.

(21) Appl. No.: 10/653,466

(22) Filed: Sep. 3, 2003

(65) Prior Publication Data

US 2004/0165724 A1    Aug. 26, 2004

Related U.S. Application Data

(60) Provisional application No. 60/410,816, filed on Sep. 16, 2002.

(30) Foreign Application Priority Data

Feb. 20, 2003   (KR) ...................... 10-2003-0010712

(51) Int. Cl.
    *H04L 9/00* (2006.01)
(52) U.S. Cl. .................. 380/277; 380/255; 380/259
(58) Field of Classification Search .................. 380/44, 380/45, 28; 713/162; 707/104.1
    See application file for complete search history.

(56) References Cited

U.S. PATENT DOCUMENTS

| | | | |
|---|---|---|---|
| 5,796,839 A * | 8/1998 | Ishiguro ...................... 380/44 |
| 5,917,911 A * | 6/1999 | Dabbish et al. .............. 380/286 |
| 6,049,878 A * | 4/2000 | Caronni et al. ................. 726/3 |
| 6,263,435 B1 * | 7/2001 | Dondeti et al. .............. 713/163 |
| 6,360,320 B1 * | 3/2002 | Ishiguro et al. ............. 713/164 |
| 6,373,948 B1 * | 4/2002 | Wool .......................... 380/241 |
| 6,735,313 B1 * | 5/2004 | Bleichenbacher et al. ... 380/241 |
| 7,043,637 B2 * | 5/2006 | Bolosky et al. .............. 713/171 |
| 7,047,241 B1 * | 5/2006 | Erickson ......................... 707/9 |
| 7,095,850 B1 * | 8/2006 | McGrew ...................... 380/42 |
| 7,249,264 B2 * | 7/2007 | Belknap et al. ............. 713/189 |
| 7,269,257 B2 * | 9/2007 | Kitaya et al. .................. 380/45 |

(Continued)

FOREIGN PATENT DOCUMENTS

EP    768774 A2 *    4/1997

(Continued)

OTHER PUBLICATIONS

Birget et al, "Hierarchy-based access control in distributed environments", 5 pages, publication date unknown.*

(Continued)

*Primary Examiner*—Ponnoreay Pich
(74) *Attorney, Agent, or Firm*—Staas & Halsey LLP

(57) ABSTRACT

A method of encrypting metadata that can be represented by a tree structure. The method involves generating an encryption key for a predetermined node of the metadata using a function that takes as input parameters an encryption key for an upper node of the predetermined node and information specifying the predetermined node, and encrypting data of the predetermined node using the generated encryption key.

12 Claims, 9 Drawing Sheets

U.S. PATENT DOCUMENTS

| | | | |
|---|---|---|---|
| 7,391,864 B2 * | 6/2008 | Choi et al. | 380/28 |
| 7,395,425 B2 * | 7/2008 | Nakano et al. | 713/163 |
| 7,539,313 B1 * | 5/2009 | Hardjono et al. | 380/278 |
| 2002/0038296 A1 * | 3/2002 | Margolus et al. | 707/1 |
| 2002/0044657 A1 * | 4/2002 | Asano et al. | 380/201 |
| 2002/0114466 A1 * | 8/2002 | Tanaka et al. | 380/232 |

FOREIGN PATENT DOCUMENTS

| | | |
|---|---|---|
| EP | 996 250 A2 | 4/2000 |
| EP | 1 051 036 A2 | 11/2000 |
| EP | 1176754 A2 * | 1/2002 |
| EP | 1650893 A1 * | 4/2006 |
| EP | 1710947 A1 * | 10/2006 |
| JP | 2000-122861 | 4/2000 |
| JP | 2002-077131 | 3/2002 |
| JP | 2002-111650 | 4/2002 |
| KR | 2001-0007044 | 1/2001 |
| WO | 00/04713 | 1/2000 |

OTHER PUBLICATIONS

International Search Report dated Aug. 1, 2003 for PCT International Application No. KR03/00712.
Koren Office Action for corresponding Korean Application 10-2003-0010712; dated Sep. 29, 2009.

* cited by examiner

FIG. 3

- \<A  name = EX\>
    - \<B  quality = bbb\>
        - \<C1\> ccc \<C1/\>
        - \<C2\> ddd \<C2/\>
- \<B/\>
- \<D  weight= 1 \>
    - \<E1 quality = 3 \>
        - \<F1\> bad \<F1/\>
        - \<F2\> good \<F2/\>
    - \<E1/\>
    - \<E2\> e2e2 \<E2/\>
  - \<D/\>
- \<A/\>

FIG. 4

```
<ProgramInformation programId="crid://hbc.com/foxes/episode11">
    <ProgramInformationTable>
  <BasicDescription>
    <Title type="main">
      The one where Fox jumps in the Potomac
    </Title>
    <Synopsis>
      Fox goes to Washington and jumps in the  Potomac
    </Synopsis>
        <Keywords>
        <mpeg7:Keyword>Fox</mpeg7:Keyword>
        <mpeg7:Keyword>Washington</mpeg7:Keyword>
        <mpeg7:Keyword>Potomac</mpeg7:Keyword>
        </Keywords>
    <Genre href = "urn:tva:TVAFormat.3.5.7.3" type="main"/>
  </BasicDescription>
  <OtherIdentifier>guid://e41a-b456-a876-3e49</OtherIdentifier>
<OtherIdentifier>urn:mpeg:mpeg21:diid:v-isan:29ef-94ba-53c4-
  3e7a-4ce8-5a45-98ec-f</OtherIdentifier>
  <MemberOf crid = "crid://hbc.com/foxes/all" index = "11" xsi:type =
"EpisodeOfType"/>
  </ProgramInformation>
</ProgramInformationTable>
```

FIG. 7

License for metadata M_ex

Top level Key = Key_A
Encryption algorithm: AES
One way function = F
All nodes encrypted using relative position information.

User U1: Authentication by XXX method with value xxx
   Access grant level to user U1 = <A>
   Usage: show, copy, read                                    — 720

User U2: Authentication by YYY method with yyy
   Access grant level to user U2 = <A/B>
   Usage: show, copy, read                                    — 722

User U3: Authentication by ZZZ method with zzz
   Access grant level to user U3 = <A/D/E1>
   Usage: copy
   Condition: Fee $10                                         — 724

METHOD FOR ENCRYPTING AND DECRYPTING METADATA

CROSS-REFERENCE TO RELATED APPLICATIONS

This application claims the priority of Korean Patent Application No. 2003-10712, which was filed on Feb. 20, 2003, in the Korean Intellectual Property Office, and U.S. Patent Application No. 60/410,816, which was filed on Sep. 16, 2002, in the U.S. Patent & Trade Office, the disclosures of which are incorporated herein in their entirety by reference.

BACKGROUND OF THE INVENTION

1. Field of the Invention

The present invention relates to a method of encrypting and decrypting metadata, and a method of and a system for managing metadata, and, more particularly, to a method of and a system for effectively managing metadata using a method for effectively encrypting and decrypting metadata.

2. Description of the Related Art

High expectations exist for the wide use of additional kinds of metadata in future broadcasting environments, because metadata, other than the electronic program guides (EPGs), which have been used in a conventional broadcasting system, will be widely used.

Compared to such simple programs as EPGs, metadata-related information requires more time and money to extract or schedule. Therefore, the cash value of metadata is too high to ignore, and proper metadata management and protection are considered very important. For this reason, metadata is differentiated from conventional EPG data, which can be freely accessed by arbitrary subscribers or viewers surfing on the Internet.

For example, the proper management and protection of user description information in metadata is considered to be as important as ensuring user privacy. As it is important to prevent program information from being illegally duplicated, control of metadata usage, such as user description information, is also important because it is closely related to providing value-added services.

In a conventional broadcasting environment, attention is primarily focused on the type of broadcasting system, e.g., whether the broadcasting system is a terrestrial broadcasting system, a satellite broadcasting system, or a cable broadcasting system, when tackling the problem of proper management and protection of media data. In such a conventional broadcasting system, where metadata is used for the purpose of providing media data, usage of metadata is not performed through any type of proper management and protection mechanism.

However, certain pieces of information that are included in metadata, for example, program review information and segmentation information, require much more effort to establish, and thus need more restricted usage rules than other pieces of information in the metadata. In addition, in the case where metadata includes a user's personal information, such as metadata usage history, a third person, for example, a service provider, is required to abide by rules established by the user in order to use the user's personal information.

Given the variety of expected usage of metadata in a broadcasting environment in the near future, proper management and protection of metadata are extremely important.

As an increase occurs in the amount and complexity of information, which can be included in metadata and used for a broadcasting system, proper management and protection of metadata becomes a greater issue. However, an effective method for managing and protecting metadata has not yet been proposed, and thus it is hard to effectively protect metadata with the current level of technology.

SUMMARY OF THE INVENTION

Accordingly, it is an aspect of the present invention to provide a method of effectively encrypting and decrypting metadata.

It is another aspect of the present invention to provide a method of and a system for managing metadata, which are capable of effectively managing and protecting metadata.

Additional aspects and/or advantages of the present invention will be set forth in part in the description that follows, and, in part, will be obvious from the description, or may be learned by practicing the present invention.

According to an aspect of the present invention, there is provided a method of encrypting metadata that can be represented by a tree structure. The method involves generating an encryption key for a predetermined node of the metadata using a function that takes as input parameters an encryption key for an upper node of the predetermined node and information specifying the predetermined node, and encrypting data of the predetermined node using the generated encryption key.

According to another aspect of the present invention, there is provided a method of decrypting metadata that can be represented by a tree structure. The method involves generating an encryption key for a predetermined node of the metadata using a function that takes as input parameters an encryption key for an upper node of the predetermined node and information specifying the predetermined node, and decrypting data of the predetermined node using the generated encryption key.

According to another aspect of the present invention, there is provided a method of managing metadata that can be represented by a tree structure. The method involves receiving a request for metadata of a predetermined node of encrypted metadata, verifying a license for the requested metadata, and providing decryption information for the requested metadata if the license for the requested metadata is verified. Here, the requested metadata of the predetermined node has been encrypted using a function that takes as input parameters an encryption key for an upper node of the predetermined node and information specifying the predetermined node.

According to another aspect of the present invention, there is provided a system which manages encrypted metadata that can be represented by a tree structure. The system includes an input unit which receives a request for metadata of a predetermined node, which is encrypted, a metadata license storing unit in which a user license for the requested metadata is stored, and a metadata management unit which verifies a license for the requested metadata by comparing it with the user license stored in the metadata license storing unit and outputs decryption information if the license for the requested metadata is verified. Here, the metadata of the predetermined node, which can be represented by a tree structure, has been encrypted using a function that takes as input parameters an encryption key for an upper node of the predetermined node and information specifying the predetermined node.

BRIEF DESCRIPTION OF THE DRAWINGS

These and/or other aspects and/or advantages of the present invention will become more apparent by describing in detail exemplary embodiments thereof with reference to the attached drawings in which:

FIG. 3 is a diagram illustrating an example of metadata written in XML;

FIG. 4 is a diagram illustrating another example of metadata written in XML;

FIG. 7 is a diagram illustrating an example of a license used for managing metadata, according to an embodiment of the present invention;

DETAILED DESCRIPTION OF THE PREFERRED EMBODIMENTS

Figure 1:
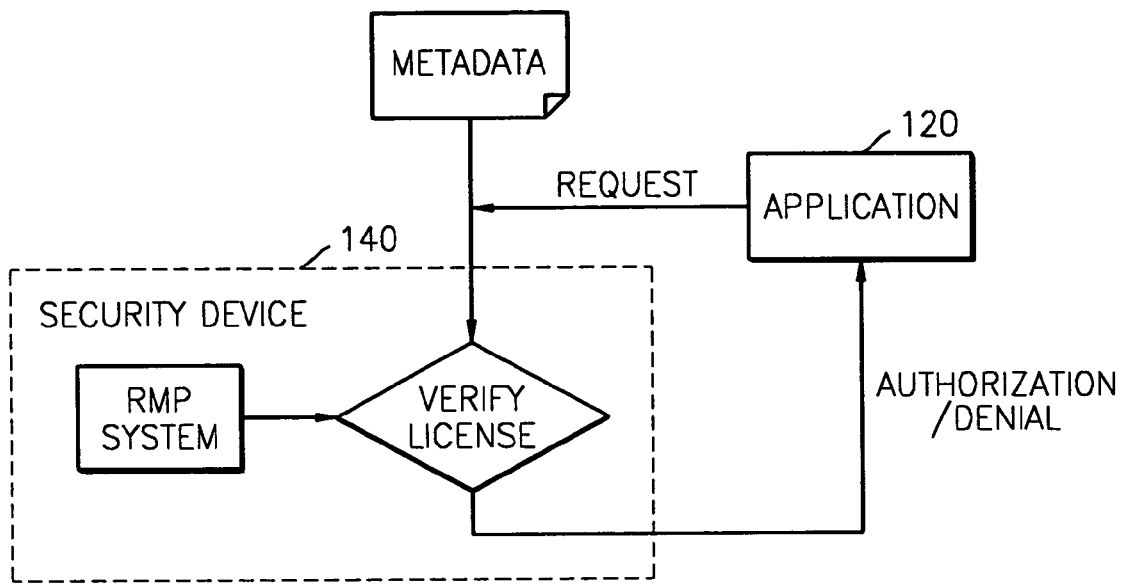
FIG. 1 is a block diagram illustrating metadata management performed in a TV-Anytime right management and protection (RMP) environment.

Reference will now be made in detail to the embodiments of the present invention, examples of which are illustrated in the accompanying drawings, wherein like reference numerals refer to like elements throughout.

FIG. 1 is a diagram illustrating metadata management. As shown in FIG. 1, when an application 120 requests usage of metadata, for example, copying of a predetermined fragment of metadata, a right management and protection (RMP) security device 140 determines whether the application 120 has a license for issuing the specified request, and either permits or denies the request based on the determination result.

Hereinafter, metadata management will be described with reference to the characteristics of metadata used for TV-Anytime.

Figure 2:
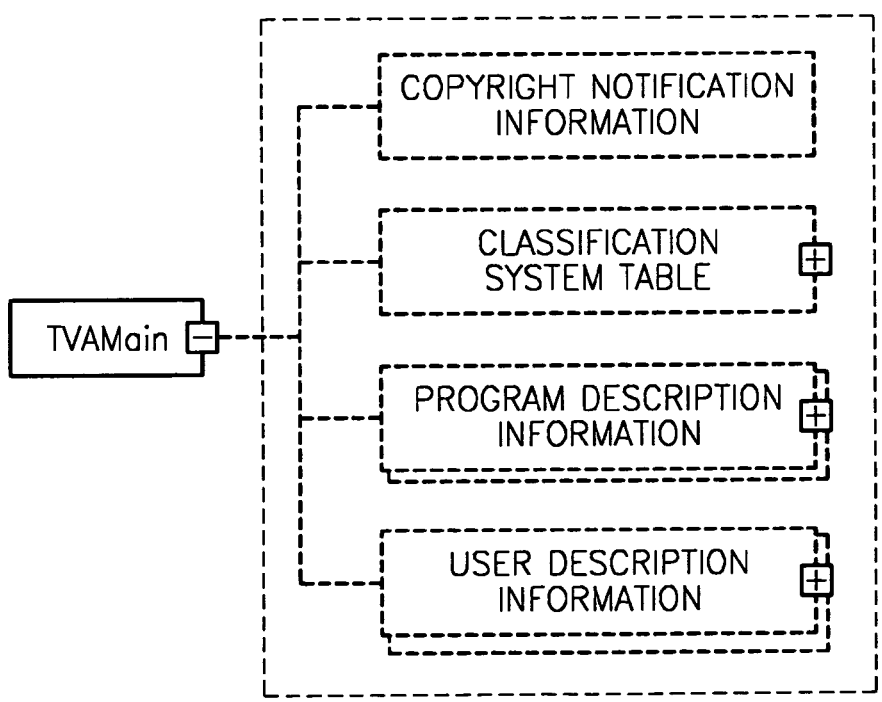
FIG. 2 is a diagram illustrating the structure of a TV-Anytime main document.

Elements of a TV-Anytime main document can be classified into the categories shown in FIG. 2. More specifically, the TV-Anytime main document is divided into user description information and other data, including program description information, a classification scheme table, and copyright notification information.

For the convenience of explanation, the "other data" will be referred to as program description-related information.

It is reasonable to assume that a third person rather than a user provides the program description-related information and the user description information to the user. The program description-related information relates to a program and a service provided to a user. Usage of metadata by a user device can be classified into a copy operation, a modify operation, a view operation, and a consume operation, which will be described in greater detail in the following paragraphs.

The copy operation indicates the process of copying received metadata into a local storage unit or providing a copy of received metadata, such as computer graphics metafiles in A/V data, to a third person.

Examples of the modify operation are as follows. For the purpose of indexing a preferred shot of segmentation data from a provided program, a user generates personalized segmentation data, a process which corresponds to the modify operation. When a user is not satisfied with segmentation data provided by a service provider, the segmentation data can be modified, a process which is also categorized as the modify operation. In short, the modify operation is characterized by a user modifying provided metadata.

The view and consume operations are generally related to the use of metadata. An application reads metadata and generates output information using the read metadata. In general, the generated output information deals with a predetermined operation performed on media data, for example, an operation of reproducing or recording media data. However, the generated output information may be identified with metadata itself. For example, in some cases, all or some of the metadata content can be viewed by a user or another third person, in which case the metadata viewed by the user or third person is represented in plain text format or a graphical user interface (GUI) format that can lead to better understanding. Regardless of the metadata format, the content of the metadata is available to the public. For example, in the case of relatively short metadata, the content of the metadata can be simply duplicated through copying by hand.

Even more typical examples of the "view" and "consume" operations are as follows. In the case where an application receives a request for a highlight-type segment group of a predetermined program, the application accesses and reads metadata corresponding to the segment group and extracts locators of segments. Thereafter, the application senses the locations of some selected segments, decrypts and decompresses the selected segments, and sequentially reproduces the decrypted and decompressed segments.

In this case, it is reasonable to consider that the application may need to check whether it has a right to reproduce all or some parts of a program. Therefore, the view and consume operations are closely related to a service permission right.

Strictly speaking, consumption of metadata is different from the viewing of metadata. However, in a typical application scenario, it is hard to differentiate the two operations, i.e., the consume and view operations, from one another.

Hereinafter, the user description information will be described. User description metadata used in TV-Anytime includes content usage history and user preference information. The user description metadata also includes a user's personal information. In the case where the user description metadata is transmitted to a third person, for example, a service provider, a problem arises regarding the right to use the user description metadata. This problem is similar to the one that arises when there is an attempt to copy program description metadata.

Hereinafter, different usage of the user description metadata will be described in greater detail. One of the simplest ways to copy user description metadata is to record a user's personal data to a storage device, such as a hard disk drive (HDD). Copying and transmitting the user's personal data to a third person is a very complicated task because authorization to use the personal data is required from the user. There are two different types of authorization regarding a user's personal data. One type is authorizing a third person to transmit received data to another third person, and the other type is authorizing a third person to process data and to use the processed data for a predetermined service, for example, target advertising. The latter may be divided into two different cases, i.e., a case where the predetermined service is aimed at an original user and another case where the predetermined service is aimed at another user.

There are many different examples of modifying user description metadata. One example is a user's modification or deletion of information regarding his or her preferences, i.e., user preference description information. Another example includes agent software, installed in a predetermined device, automatically modifying the user preference description information based upon content usage history. In this case, the agent software can view or consume information regarding the content usage history.

In addition, another example of modifying user description metadata is a user viewing and searching content usage history for a predetermined program and then reproducing or recording the searched program. Still another example is agent software filtering and searching programs based upon the user preference description information.

Once personal data is open to the public, very serious legal problems can occur, regardless of how much personal data is unleashed. Therefore, allowing a user's personal data to be seen by any other user or third person in a remote area can cause even more serious problems than making program description information available to the public. Therefore, attempts to make users personal data open to the public should generally be strictly prohibited.

FIG. 3 is a diagram illustrating an example of metadata written in XML.

A method of managing metadata, according to an embodiment, is provided for the purpose of more effectively protecting and managing metadata. In the present embodiment, the metadata is represented in XML. For example, <A>, 'name', and 'EX' represent a tag, an attribute name, and an attribute value, respectively.

By using the metadata shown in FIG. 3, for example, segment-related metadata, a user can watch a 15 minute-long highlight comprised of several main segments from a 60 minute-long program rather than an entire program.

In an embodiment, XrML is used to represent metadata. However, metadata can be represented in different formats other than XrML, such as html, text, and binary.

FIG. 4 is a diagram illustrating another example of metadata written in XML.

Figure 5:
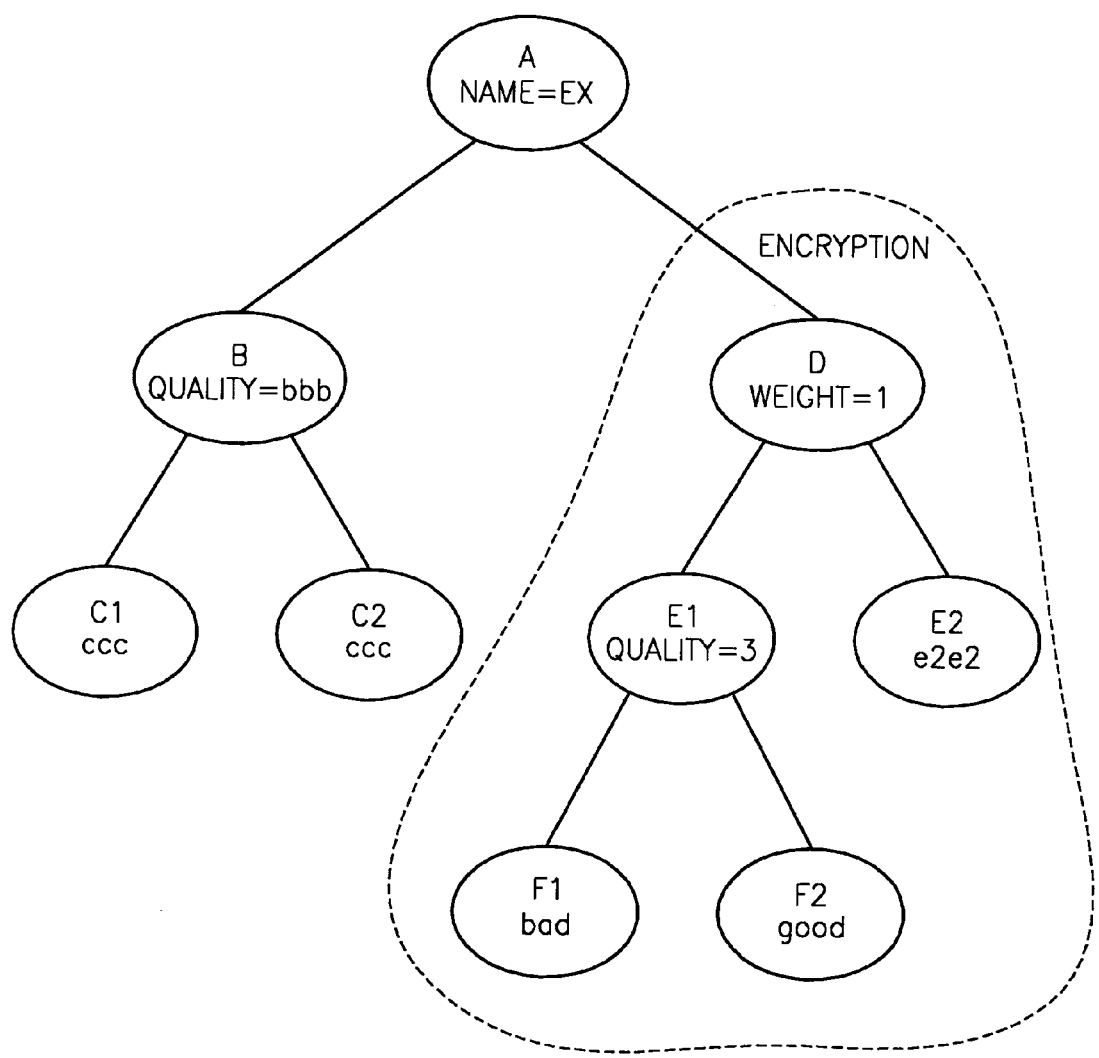
FIG. 5 is a diagram illustrating metadata represented in a tree structure.

FIG. 5 is a diagram illustrating metadata represented in a tree structure, for more fully describing a method of protecting and managing metadata according to an embodiment of the present invention. The metadata represented in a tree structure, as shown in FIG. 5, is identical to the metadata written in XML shown in FIG. 3.

In order to effectively protect and manage the metadata shown in FIG. 5, encryption of all sub-nodes of node A should be made possible. Alternatively, encryption of only some of the nodes, i.e., node D and its sub-nodes, should also be made possible.

Here, random access to each of the nodes shown in FIG. 5 must be guaranteed for flexible encryption and decryption of metadata.

In other words, by transmitting metadata together with an access right, for example, license description information, only a specific user is allowed to decrypt or use encrypted parts of the metadata. For example, only a set-top box having a key to node D is allowed to have access to encrypted metadata corresponding to node D and its sub-nodes.

Figure 6:
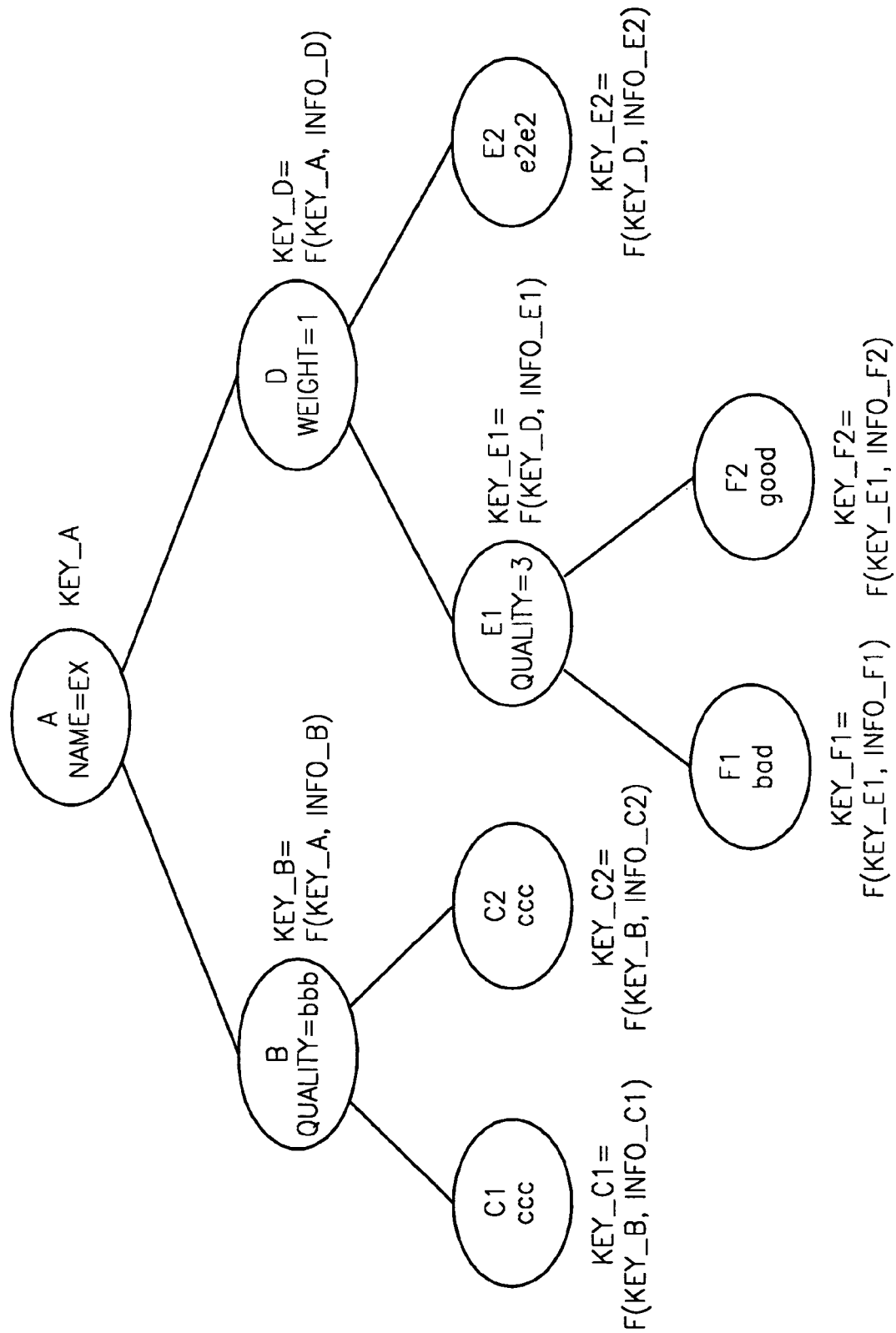
FIG. 6 is a diagram illustrating a method of encrypting metadata, according to an embodiment of the present invention.

FIG. 6 is a diagram illustrating a method of protecting and managing metadata, according to an embodiment of the present invention, in particular, a method of encrypting metadata.

Referring to FIG. 6, data contained in node A is encrypted using an encryption key Key_A and an encryption algorithm, such as the advanced encryption standard (AES). In the present embodiment, AES is the algorithm used for encrypting data of a predetermined node. However, in some cases, an arbitrary encryption algorithm can also be used.

Data contained in node B, which is a child node of node A, is encrypted using an encryption key Key_B. The encryption key Key_B is obtained using the following equation:

$$\text{Key\_}B = F(\text{Key\_}A, \text{Info\_}B) \tag{1}$$

In Equation (1), Info_B represents position information of node B, and F represents a one-way function, such as a hash function, which cannot perform inverse operations. Here, it is possible to obtain Key_B by inputting Key_A and Info_B into Equation (1) while it is impossible to obtain Key_A by inputting Key_B and Info_B into Equation (1).

In the present embodiment, absolute position information of a predetermined node is used as the position information of the predetermined node. However, in some cases, relative position information or index information that can specify the predetermined node can also be used. For example, in the case of specifying the predetermined node using absolute position information, Info_B is 1, and Info_D representing absolute point information of node D is 2. In the same manner, Info_C1, Info_C2, Info_E1, Info_E2, Info_F1 and Info_F2 are 3, 4, 5, 6, 7, and 8, respectively.

Node C1, which is one of the child nodes of node B, is encrypted using Equation (2) below.

$$\text{Key\_}C1 = F(\text{Key\_}B, \text{Info\_}C1) \tag{2}$$

In Equation (2), Info_C1 represents relative position information or absolute position information of node C1, and F, like in Equation (1), represents a one-way function. Here, it is possible to obtain Key_C1 by inputting Key_B and Info_C1 into Equation (2) while it is impossible to obtain Key_B by inputting Key_C1 and Info_C1 into Equation (2).

Another child node D of node A is encrypted using Equation (3) below.

$$\text{Key\_}D = F(\text{Key\_}A, \text{Info\_}D) \tag{3}$$

In Equation (3), Info_D represents relative position information or absolute position information of node D.

A child node E1 of node D is encrypted using Equation (4) below.

$$\text{Key\_}E1 = F(\text{Key\_}D, \text{Info\_}E1) \tag{4}$$

In Equation (4), Info_E1 represents relative position information or absolute position information of node E1.

Another child node E2 of node D is encrypted using Equation (5) below.

$$\text{Key\_}E2 = F(\text{Key\_}D, \text{Info\_}E2) \tag{5}$$

In Equation (5), Info_E2 represents relative position information or absolute position information of node E2.

In the same manner, child nodes F1 and F2 of node E1 and child node C2 of node B are encrypted.

As described above, in the method of protecting and managing metadata according to the present invention, a one-way function is described that generates key information of each node based upon node information and parent node information.

Therefore, it is possible to decrypt information in any of the nodes shown in FIG. 6 by using one piece of key information, i.e., Key_A. In other words, once Key_A is provided, decryption is possible for all the child nodes of node A.

In addition, since in the present embodiment, key information of a predetermined node is generated using a one-way function and position information of the predetermined node, it is possible to decrypt only a part of encrypted metadata.

Therefore, according to the method of encrypting metadata in a tree structure of the present invention, it is possible to randomly access and decrypt specific sub-branches of the tree structure. Random access to a predetermined node, for example, node D, enables access to the node or any child nodes of node D. However, this scenario does not allow random access to information of node A and node B, which are node D's parent node and sibling node, respectively.

In short, it is possible to effectively and flexibly protect and manage metadata using the method of encrypting metadata shown in FIG. 6.

For example, it is possible for a predetermined user, such as a set-top box, to decrypt part of the encrypted metadata shown in FIG. 6, i.e., node E1 and its child nodes, by transmitting the key information of node E1, i.e., Key_E1, to the set-top box.

According to the method for managing and protecting metadata of the present invention, it is possible to effectively and flexibly manage metadata by providing different levels of rights for accessing the metadata of different users.

FIG. 7 is a diagram illustrating an example of a license used for protecting and managing metadata, according to the present invention.

According to the method of protecting and managing metadata of the present invention, a license file shown in FIG. 7 is transmitted together with metadata from a server of a broadcasting service provider to the client device of a user.

Hereinafter, license information concerning metadata, shown in FIG. 7, will be described in greater detail.

License information of metadata includes information regarding the metadata to which a license is applied, master key information, pieces of information on an encryption algorithm, an encryption key generation function, parameters for the encryption key generation function, and access right information of users U1, U2, and U3.

The metadata used in the present embodiment may be the same as the one shown in FIG. 3. In FIG. 7, M_ex represents the metadata.

The license information of the metadata M_ex includes the master key information, i.e., Key_A. The master key information Key_A is not known to a user or an application but is used by a system for protecting and managing metadata shown in FIG. 8. The system for protecting and managing metadata will be described more fully in the following paragraphs with reference to FIG. 8.

In the present embodiment, advanced encryption standard (AES) is used as the encryption algorithm. However, in some cases, encryption algorithms other than AES can also be used.

The license information also includes information F, which relates to a one-way function used to generate encryption key information. In the present embodiment, a hash function is used as the one-way function, and relative position information is used as position information of a predetermined node. In some cases, absolute position information or predetermined index information specifying the predetermined node can be used instead of the relative position information.

The user U1's access right information 720, the user U2's access right information 722, and the user U3's access right information 724 describe the level and usage rights granted to the corresponding users for accessing the metadata.

In the user U1's access right information 720, <A> represents an authorization level granted to user U1. It also indicates user U1 is allowed to access information corresponding to the uppermost node A, and all of its child nodes, and has rights to show, copy, and read whatever is accessed.

In addition, the access right information 720, 722, and 724 further includes an authentication method and information necessary to verify the identification of a user, i.e., a password or authentication-related information.

In the user U2's access right information 722, <A/B> represents an authorization level granted to the user U2. It also indicates user U2 is allowed to access information corresponding to node B and all of its child nodes, and has rights to show, copy and read whatever is accessed.

In the user U3's access right information 724, <A/D/E1> represents an authorization level granted to the user U3. This authorization level allows the user U3 to access information corresponding to node E1 and its child nodes, and indicates rights to copy whatever is accessed. In order for the user U3 to access any of the authorized nodes, i.e., E1, F1, and F2, the user U3 must pay a $10 access charge in advance.

Figure 8:
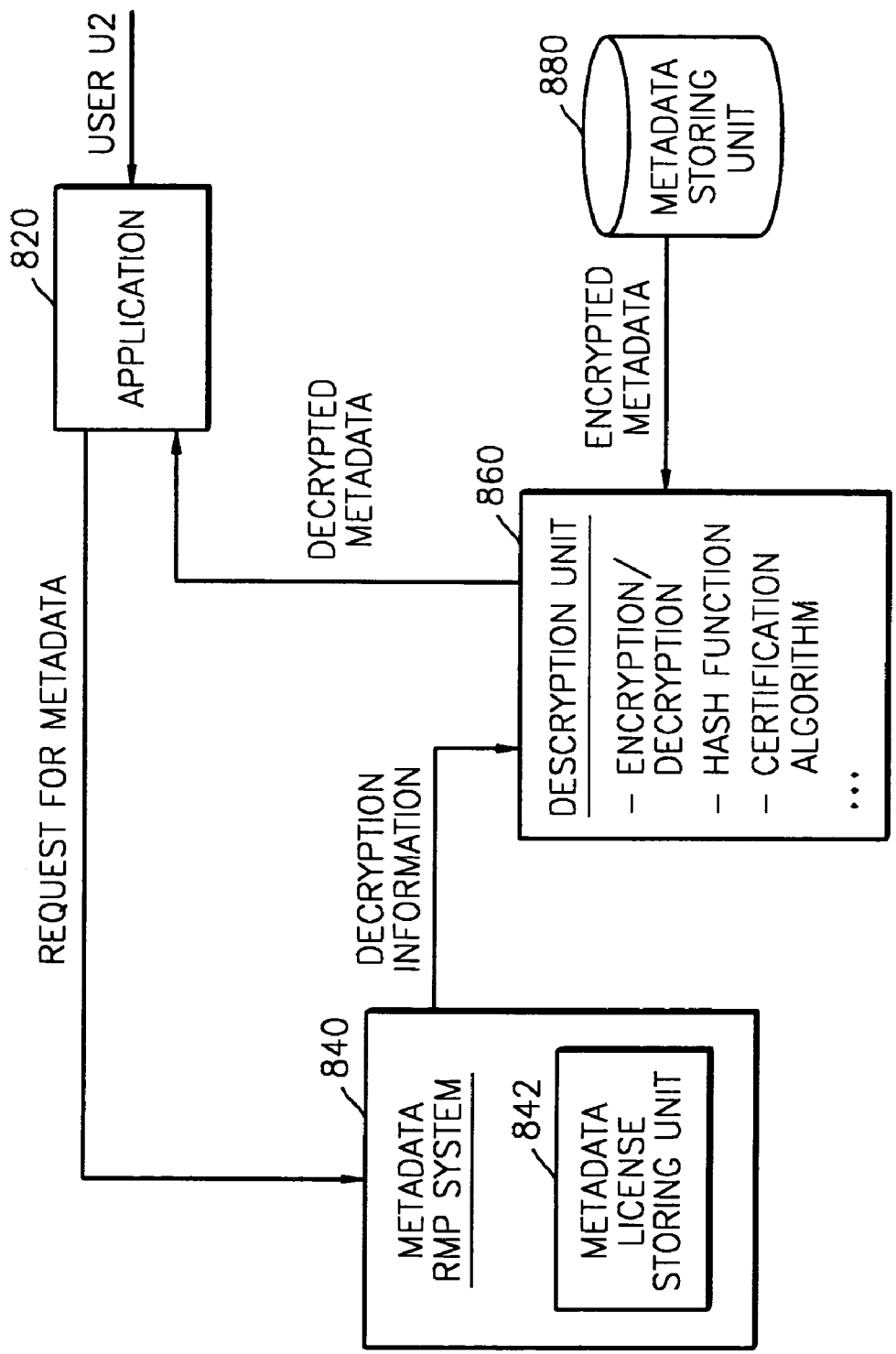
FIG. 8 is a diagram illustrating a system for managing metadata, according to an embodiment of the present invention.

FIG. 8 is a diagram illustrating a system for managing metadata according to an embodiment of the present invention. Referring to FIG. 8, the user U2 issues a request for metadata, corresponding to node C1, to be copied using a predetermined application 820, for example, WINDOWS MEDIA PLAYER. In the present invention, metadata corresponding to each node of the tree structure shown in FIG. 6 is encrypted using the encryption key of the corresponding node's upper node, the corresponding node's position information, and a one-way function.

In response to the request issued by the user U2, a metadata right management and protection (RMP) system 840 checks license information of the user U2, stored in a metadata license storing unit 842, and then determines whether to authorize the user U2's request. If the metadata RMP system 840 determines to accept the user U2's request, it transmits decryption information requested by the user U2, which is necessary for decrypting information corresponding to node C1, to a decryption unit 860. The decryption information includes the key information Key_A of the uppermost node A, the position information of node C1, and an encryption algorithm. In some cases, the decryption information may include the key information Key_C1 of node C1, instead of Key_A.

In the case where a request for metadata is input into the metadata RMP system 840 via the application 820, the metadata RMP system 840 performs authentication of the user U2.

The decryption unit 860 generates the key information of node C1 based upon the decryption information input from the metadata RMP system 840; decrypts metadata, corresponding to node C1 and its child nodes, input from a metadata storing unit 880; and outputs the decrypted metadata to the application 820. An encryption and decryption engine, a hash function, and a certification algorithm are installed in the decryption unit 860.

Figure 9:
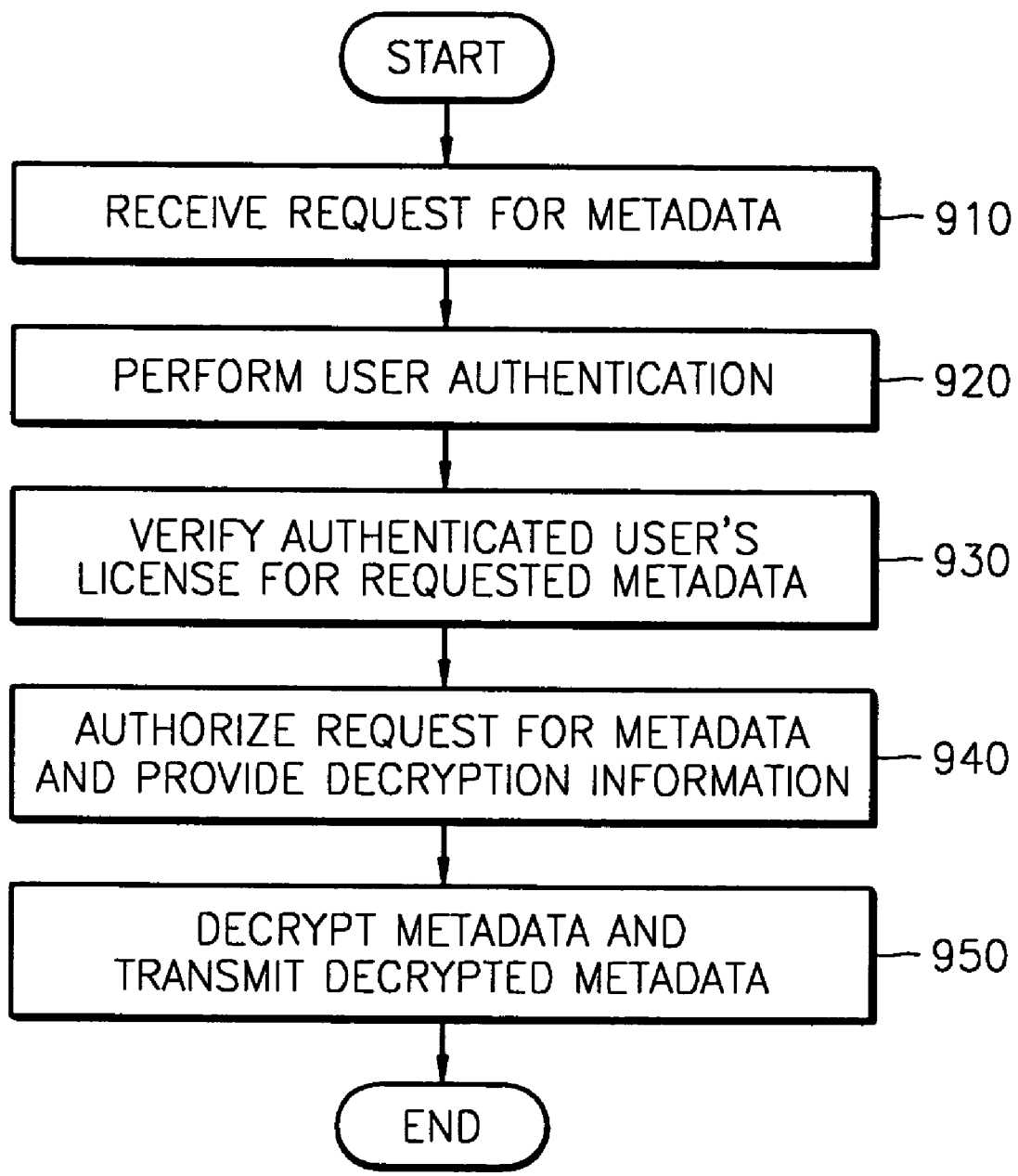
FIG. 9 is a flowchart of a method of managing metadata, according to an embodiment of the present invention.

FIG. 9 is a flowchart of a method of managing metadata according to an embodiment of the present invention.

In operation 910, the user U2 issues a request for metadata of node C1 using a predetermined application, for example, WINDOWS MEDIA PLAYER. Data in each of the nodes shown in FIG. 6 are encrypted using the encryption key of the corresponding node, the corresponding node's position information, and a one-way function.

In operation 920, authentication of the user U2 is performed.

In operation 930, verification occurs regarding whether the user U2 has a license to use the requested metadata.

In operation 940, information necessary to decrypt the requested metadata, i.e., the uppermost node's key information Key_A and the position information of node C1, are provided if the user U2 has a verified license. In some cases, an encryption algorithm may be further provided.

In operation 950, the requested metadata is decrypted based on the provided decryption information, and then the decrypted metadata is transmitted to the predetermined application.

Figure 10:
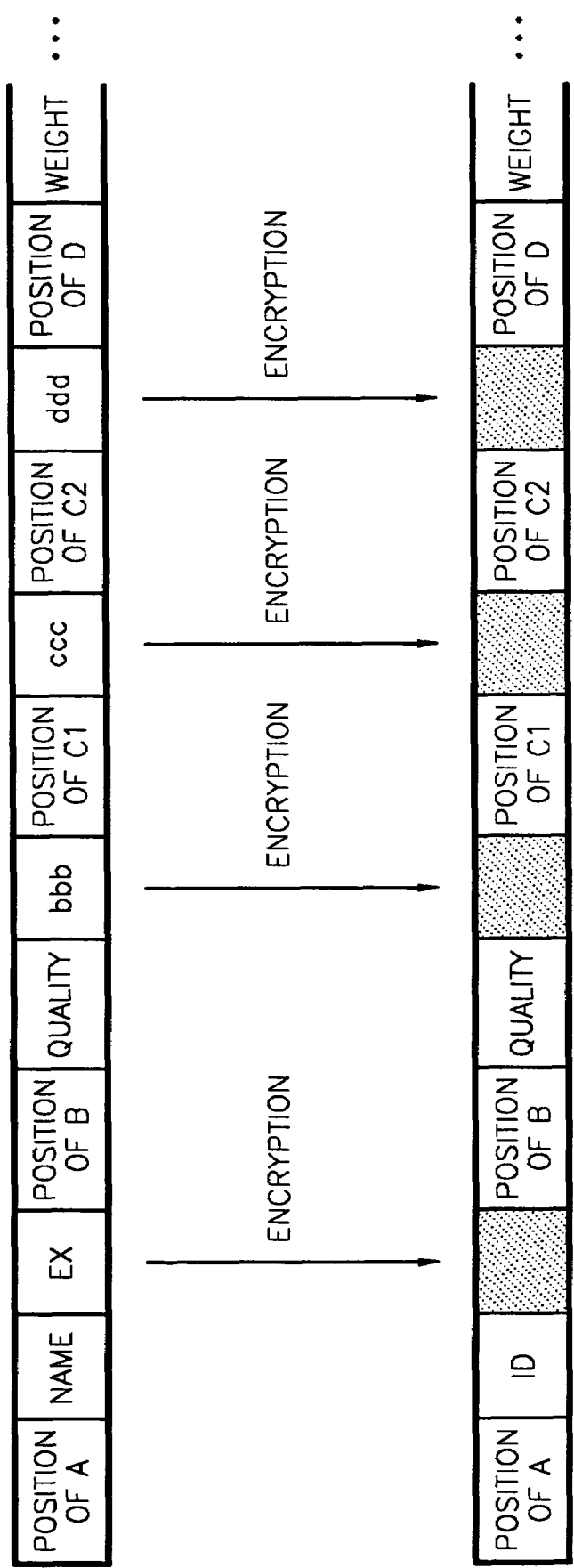
FIG. 10 is a diagram illustrating a method of encrypting metadata written in XML, as shown in FIG. 3, into binary format.

FIG. 10 is a diagram illustrating a method of encrypting metadata written in XML into binary format, according to an embodiment of the present invention.

According to another embodiment of the present invention, only attribute values in metadata are encrypted. In other words, position information and attribute names are not encrypted. By not encrypting the position information and the attribute names, it is possible to easily decrypt only predetermined sub-branches of an XML tree structure, rather than the entire XML tree.

The present invention can be realized as computer-readable code written on a computer-readable recording medium. The computer-readable recording medium includes all kinds of recording media on which data can be written in a manner by which the data can be read by a computer system. The computer-readable recording medium includes ROM, RAM, a CD-ROM, a magnetic tape, a hard disk, a floppy disk, flash memory, optical data storage, and a carrier wave, such as data transmission through the Internet. In addition, the computer-readable recording medium can be decentralized to a plurality of systems connected to one another over a network. In this case, the computer-readable code embodying the present invention can be written on the computer-readable recording medium and executed in a decentralized manner.

As described above, the method of protecting metadata according to the present invention uses a one-way function, key information of an uppermost node, and position information of a predetermined node to encrypt and decrypt metadata of the predetermined node. Therefore, it is possible to effectively manage and protect metadata while minimizing the management information necessary to protect the metadata.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encrypting metadata that is represented by a tree structure, comprising:
generating an encryption key for a predetermined node of the metadata using a function that takes as input parameters an encryption key for an immediately-preceding upper node of the predetermined node and information specifying the predetermined node at a processor of a user device and encrypting data of the predetermined node using the generated encryption key; and
storing the encrypted data at a metadata storing unit,
wherein the information specifying the predetermined node is position information of the predetermined node in the tree structure.

2. The method of claim 1, wherein the function is a one-way function.

3. The method of claim 1, wherein the information specifying the predetermined node is relative position information.

4. The method of claim 1, wherein the information specifying the predetermined node is absolute position information.

5. The method of claim 1, wherein the function is a hash function.

6. The method of claim 1, wherein the encrypted data comprises attribute values corresponding to the predetermined node.

7. A method of decrypting metadata that is represented by a tree structure, comprising:
generating a key for a predetermined node of metadata received from a metadata storing unit using a function that takes as input parameters a key for an immediately-preceding upper node of the predetermined node and information specifying the predetermined node at a processor of a user device, the generating the key being performed at a decryption unit; and
decrypting data of the predetermined node using the generated key,
wherein the information specifying the predetermined node is position information of the predetermined node in the tree structure.

8. The method of claim 7, wherein the function is a one-way function.

9. The method of claim 7, wherein the information specifying the predetermined node is relative position information.

10. The method of claim 7, wherein the information specifying the predetermined node is absolute position information.

11. The method of claim 7, wherein the function is a hash function.

12. The method of claim 7, wherein the decrypted data comprises attribute values corresponding to the predetermined node.

* * * * *

UNITED STATES PATENT AND TRADEMARK OFFICE
CERTIFICATE OF CORRECTION

| | |
|---|---|
| PATENT NO. | : 7,668,316 B2 |
| APPLICATION NO. | : 10/653466 |
| DATED | : February 23, 2010 |
| INVENTOR(S) | : Yang-lim Choi et al. |

It is certified that error appears in the above-identified patent and that said Letters Patent is hereby corrected as shown below:

Column 1, Line 11, change "Trade" to --Trademark--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,316 B2 | Page 1 of 1 |
| APPLICATION NO. | : 10/653466 | |
| DATED | : February 23, 2010 | |
| INVENTOR(S) | : Choi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1804 days.

Signed and Sealed this

Twenty-eighth Day of December, 2010

David J. Kappos
*Director of the United States Patent and Trademark Office*